May 7, 1940.　　　J. G. STEPHENSON　　　2,200,105
SYNCHRONOUS MOTOR CONTROL SYSTEM
Filed July 13, 1939
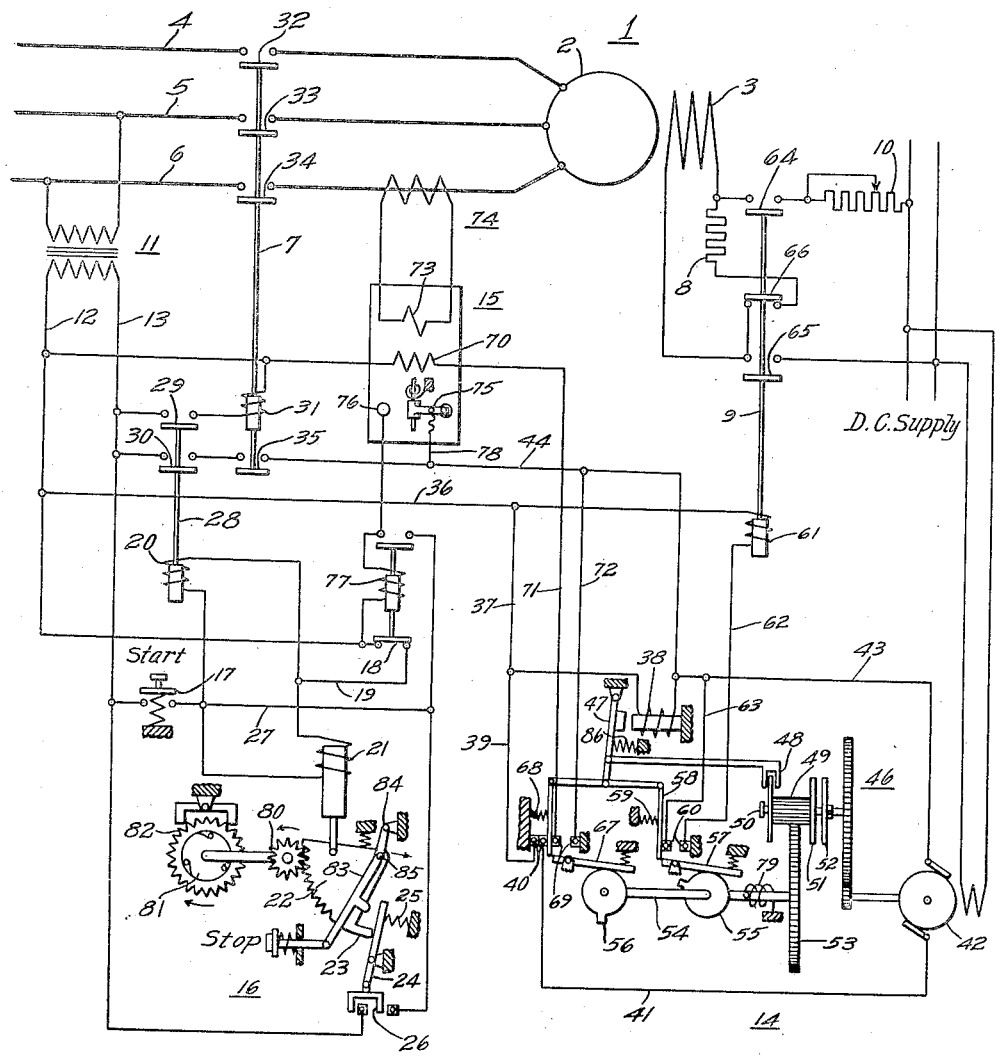
WITNESSES:
C. J. Weller.
Wm. J. Ruano
INVENTOR
James G. Stephenson.
BY
Paul E. Friedemann
ATTORNEY Patented May 7, 1940

2,200,105

UNITED STATES PATENT OFFICE 2,200,105

SYNCHRONOUS MOTOR CONTROL SYSTEM

James G. Stephenson, Wilkinsburg, Pa., assignor to Westinghouse Electric & Manufacturing Company, East Pittsburgh, Pa., a corporation of Pennsylvania Application July 13, 1939, Serial No. 284,153

12 Claims. (Cl. 172—289)

My invention relates to a control system for a synchronous motor or other similar electrical motors and is particularly directed to a starting scheme embodying the necessary protective devices and means for effecting resynchronization upon removal of a fault.

In past schemes for controlling synchronous motors and the like wherein power factor protection was desired, complicated control schemes have been used in connection with a power factor meter in order to nullify the initial effect of the power factor meter while it is registering power factor of the synchronous motor supply circuit during starting when the motor is coming up to speed and when the power factor is abnormally low.

An object of my invention is to provide a simple time delay means for introducing the power factor meter in the circuit only after the motor has come up to synchronous speed and after the direct current excitation has been applied to the field of the synchronous motor.

Another object of my invention is to provide a control system for effecting starting of the synchronous motor and embodying the necessary protection thereof which is simple, embodying a minimum number of parts, but which is highly reliable in operation.

Other objects and advantages will become more apparent from a study of the following specification when considered in conjunction with the accompanying drawing, in which:

The single figure is a schematic showing of a control system embodying the principles of my invention wherein numeral 1 denotes a synchronous motor having an armature or rotor 2 and field winding 3. The armature 2 is energized from a three-phase source of alternating current which is applied to conductors 4, 5 and 6. A line contactor 7 is provided for the purpose of completing or interrupting the circuit from the alternating current source to the armature 2. The field winding 3, when not energized with direct current, is normally shunted by a discharge resistor 8. Upon the reaching of the balanced slip speed, relay 9 is operated which effects completion of the circuit of the field winding 3 to a direct current source of supply as shown through a variable resistor 10 and at which time the circuit through the discharge resistor 8 is interrupted, all of which is well known in the art of synchronous motor starting. Energized by one of the phases of the alternating source of supply (that is, across conductors 5 and 6) is a transformer 11. Conductors 12 and 13 are connected to the secondary of transformer 11 and may be regarded as the source of supply for the control circuits which will hereinafter be described.

The control circuits embody principally a time delay switch mechanism 14, a power factor relay 15, and a time delay stop switch mechanism 16 together with its associated low voltage coils 21 and 28.

The operation of the device is as follows: Assume that the synchronous motor 1 is at rest and that it is desired to start the same. The operator then depresses the "start" push button thus completing a circuit from conductor 12 through contact members 18, conductor 19 thence through two parallel circuits, one going through low voltage coil 20 and the other going through "stop" push button coil 21, thence both circuits join and go through the contact members 17 of the "start" push button to the conductor 13.

Energization of coil 21 effects a quick upward movement of the arcuate segment 22, which in turn effects withdrawal of projection 23 from its contact with the spring biasing switch operating lever 24, thus allowing the spring 25 to close contact members 26 which contact members thus complete a parallel circuit across the "start" button contact members 17 and thus form a holding circuit for coils 20 and 21. In other words, after the start button is released, the above-described circuit remains completed except that the circuit will be completed through contact members 26 instead of contact members 17. Energization of coil 20 effects the closing of contact members 29 and 30. Closure of contact members 29 completes a circuit for coil 31. Energization of coil 31 causes closure of contact members 32, 33, 34 and 35. Thus, a circuit is completed from the alternating source to the armature winding 2 of the synchronous motor and at the same time another circuit is completed which circuit may be traced from conductor 12 through conductors 36 and 37 thence through two parallel paths, one through the electromagnet coil 38 and the other through conductor 39, closed contact members 40, conductor 41, synchronous motor 42, conductor 43, thence the two parallel paths joined and the circuit continues through conductors 44 through the contact members 35 and 30 to conductor 13. The completion of the circuit through synchronous motor 42 starts this motor 42 which in turn commences to drive a gear train 46. Energization of coil 38 effects the right-hand movement of armature 47 together with the linkage system as shown. Right-hand movement of the bifurcated member 48 effects movement to the right of the spool shaped gear member 49. Since member 49 is relatively movable with respect to shaft 50 both axially and circumferentially with respect thereto, disc-shape member 51 which functions as the driven element of a clutch will be moved into engagement with the disc-shaped driving element thereof 52, thus completing a drive from the gear train 46 through gear members 49 and 53 to cam shaft 54 thus effecting rotation of cam shaft 54 together with cams 55 and 56. In order to adjust the periods of successive time intervals, it is merely necessary to adjust the position of the cams 55 and 56 with respect to the cam shaft 54.

After continued rotation of synchronous motor 42 for a predetermined period of time, which is required for the attainment of substantially synchronous speed, cam 55 moves lever 57 upwardly against the biasing action of the spring, therefore, unlatching contact carrying lever 58, thus allowing spring 59 to effect closing of contact members 60. A circuit is thus completed from conductor 12 through conductor 36, actuating coil 61, conductor 62, closed contact members 60, and conductor 63 to energized conductor 44. Energization of coil 61 causes closure of contact members 64 and 65, thus connecting the direct current source of supply to field coil 3, and opening the circuit at contact members 66 through the discharge resistor 8.

After further continued rotation of synchronous motor 42 for a predetermined time interval, cam 56 will move levers 67 upwardly, thus unlatching a similar contact carrying member which is biased to the right by spring 68 which effects opening of contact members 49, thus interrupting the circuit through synchronous motor 42 and causes closing of contact members 69, thus completing a circuit from conductor 12 through the voltage coil 70 of the power factor meter 15 through conductor 71, closed contact members 69, conductor 72 to energized conductor 44. Thus power factor meter 15 is effectively connected in the circuit. A current carrying coil 73 thereof is energized through a current transformer 74 which is fed by the current conductor 6. If the power factor is of a normal value the movable contact carrying arm 75 is maintained in the position shown, that is, out of contact with the stationary contact member 76.

If the power factor should become abnormally low, contact members 75 will engage contact member 76, thus completing a circuit from conductor 12 through lockout coil 77, contact member 76 and arm 75, conductor 78 to conductor 44. Energization of coil 77 effects the opening of contact members 18 which interrupts the circuit through coils 20 and 21, thus effecting the opening of contact members 29, 30 and 35 which results in opening of contacts 32, 33 and 34, thus deenergizing the armature 2. The opening of contact members 35 thus deenergizes coil 38. When this occurs, return spring 79 rotates cam shaft 54 backwards to an extent such as to restore the cams 55 and 56 to their initial positions and spring 86 effects relatching of levers 57 and 67.

Assume that instead of an abnormally low power factor occurring that an abnormally low voltage in the alternating current source occurs while synchronous motor 1 is operating at synchronous speed. Both coils 20 and 21 will be partly deenergized, thus allowing the plungers associated therewith to drop. As contact members 29, 30 and 35 are interrupted, the armature 2 is deenergized and the coil 38 is likewise deenergized. If the plunger of coil 21 is allowed to fall by gravity, this fall is delayed by virtue of a gear 80 which drives through a one-way clutch 81 an escapement mechanism 82 which affords a time delay of the downward movement. In the event that the voltage rebuilds to its normal value before contact members 26 have opened, coils 20 and 21 will then again be energized sufficiently to cause upward movement of their respective plungers so as to effect resynchronization of motor 1. In the event, however, sufficient time has elapsed during the downward movement of a plunger of coil 21 so that contact members 26 have been opened, then resynchronization does not occur before the "start" button has again been depressed. Thus it will be seen that low voltage protection incorporating resynchronization possibilities within the predetermined period of time has been included.

Assume normal operation of synchronous motor 1. If it is desired to stop synchronous motor 1, the "stop" button is depressed which will effect disengagement of arcuate member 22 and gear 80 thus allowing a quick clockwise movement of lever 24 which causes opening of contact member 26, thus interrupting the circuit and effecting deenergization of synchronous motor 1. This is due to the fact that lever 83 which is pivoted at 84 carries, by pivotal connection 85, the arcuate segment 22.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A control system for a synchronous motor comprising, in combination, a synchronous motor including armature and field windings, an alternating current source of potential for said armature winding, a direct current source of potential for said field winding, time delay means for completing an electrical circuit from said direct current source to said field winding after said motor has operated for a predetermined period of time, a power factor relay which is operable by said alternating current source of potential, a circuit for said power factor relay which is completed by said time delay means at a predetermined time interval following said previous direct current, field energizing operation, said power factor relay being operable to effect deenergization of said synchronous motor upon occurrence of abnormal power factor, said time delay means including a second synchronous motor, a train of gears and two pairs of contact members which are successively operated after predetermined periods of operation of said second synchronous motor, the operation of said first pair of contact members being effective to complete a circuit from said direct current source to said field winding and the second of said pair of contact members being effective to complete a circuit through said power factor relay.

2. A control system for a synchronous motor comprising, in combination, a synchronous motor including armature and field windings, an alternating current source of potential for said armature winding, a direct current source of potential for said field winding, a power factor meter having voltage and current coils which are energized by said alternating current source, time delay switching means including a second synchronous motor, a train of gears and two pairs of contact members which are successively operated after predetermined periods of operation of said second synchronous motor, the operation of the first pair of said contact members being effective to complete a circuit from said direct current source to said field winding and the operation of the second pair being effective to complete a circuit through said voltage coil of said power factor meter.

3. A control system for a synchronous motor comprising, in combination, a synchronous motor including armature and fields windings, an alternating current source of potential for said armature winding, a direct current source of potential for said field winding, time delay means for completing an electrical circuit from said direct current source to said field winding after said motor has operated for a predetermined period of time, a power factor relay which is operable by said alternating current source of potential, a circuit for said power factor relay which is completed by said time delay means at a predetermined time interval following said previous operation, said power factor relay being operable to effect deenergization of said synchronous motor upon occurrence of abnormal power factor, said time delay means including a second synchronous motor, a train of gears and two pairs of contact members which are successively operated after predetermined periods of operation of said second synchronous motor, the operation of said first pair of contact members being effective to complete a circuit from said direct current source to said field winding and the second of said pair of contact members being effective to complete a circuit through said power factor and to interrupt the circuit through said second synchronous motor to effect deenergization thereof.

4. A control system for a synchronous motor comprising, in combination, a synchronous motor including armature and field windings, an alternating current source of potential for said armature winding, a direct current source of potential for said field winding, a power factor meter having voltage and current coils which are energized by said alternating current source, time delay switching means including a second synchronous motor, a train of gears and two pairs of contact members which are successively operated after predetermined periods of operation of said second synchronous motor, the operation of the first pair of said contact members being effective to complete a circuit from said direct current source to said field winding and the operation of the second pair being effective to complete a circuit through said voltage coil of said power factor meter, and to interrupt the circuit through said second synchronous motor to effect deenergization thereof.

5. A control system for a synchronous motor comprising, in combination, a synchronous motor including armature and field windings, an alternating current source of potential for said armature winding, a direct current source of potential for said field winding, a power factor meter having voltage and current coils which are energized, by one of the phases of said alternating current source, time delay switching means including a second synchronous motor which is coupled to a train of gears through a clutch, a pair of cam operated switches operable by said train of gears and electromagnetic operating means which upon energization effects engagement of said clutch and successive operation of said cam operated switches, the first switch effecting completion of a circuit between said direct current source and said field winding and the second switch effecting closure of a circuit through said power factor meter and also effecting deenergization of said second synchronous motor and allowing operation of a spring means for restoring the cams of said switches to their initial positions.

6. A control system for a synchronous motor comprising, in combination, a synchronous motor including armature and field windings, an alternating current source of potential for said armature winding, a direct current source of potential for said field winding, time delay means for completing an electrical circuit from said direct current source to said field winding after said motor has operated for a predetermined period of time, a power factor relay which is operable by said alternating current source of potential, a circuit for said power factor relay which is completed by said time delay means at a predetermined time interval following said previous operation, said power factor relay being operable to effect deenergization of said synchronous motor upon occurrence of abnormal power factor, low voltage protective means including a time delayed stop switch mechanism for effecting deenergization of said synchronous motor upon occurrence of low voltage and for effecting automatic resynchronization of said motor if the period of occurrence of said low voltage is less than a predetermined period of time.

7. A control system for a synchronous motor comprising, in combination, a synchronous motor including armature and field windings, an alternating current source of potential for said armature winding, a direct current source of potential for said field winding, a power factor meter having voltage and current coils which are energized by said alternating current source, time delay switching means including a second synchronous motor, a train of gears and two pairs of contact members which are successively operated after predetermined periods of operation of said second synchronous motor, the operation of the first pair of said contact members being effective to complete a circuit from said direct current source to said field winding and the operation of the second pair being effective to complete a circuit through said voltage coil of said power factor meter, low voltage protective means including a time delayed stop switch mechanism for effecting deenergization of said synchronous motor upon occurrence of low voltage and for effecting automatic resynchronization of said motor if the period of occurrence of said low voltage is less than a predetermined period of time.

8. A control system for a synchronous motor comprising, in combination, a synchronous motor including armature and field windings, an alternating current source of potential for said armature winding, a direct current source of potential for said field winding, a power factor meter having voltage and current coils which are energized, by one of the phases of said alternating current source, time delay switching means including a second synchronous motor which is coupled to a train of gears through a clutch, a pair of cam operated switches operable by said train of gears and electromagnetic operating means which upon energization effects engagement of said clutch and successive operation of said cam operated switches, the first switch effecting completion of a circuit between said direct current source and said field winding and the second switch effecting closure of a circuit through said power factor meter and also effecting deenergization of said second synchronous motor and allowing operation of a spring means for restoring the cams of said switches to their initial positions, low voltage protective means including a time delayed stop switch mechanism for effecting deenergization of said synchronous motor upon occurrence of low voltage and for effecting automatic resynchronization of said motor if the period of occurrence of said low voltage is less than a predetermined period of time.

9. A control system for a synchronous motor comprising, in combination, a synchronous motor including armature and field windings, an alternating current source of potential for said armature winding, a direct current source of potential for said field winding, time delay means for completing an electrical circuit from said direct current source to said field winding after said motor has operated for a predetermined period of time, a power factor relay which is operable by said alternating current source of potential, a circuit for said power factor relay which is completed by said time delay means at a predetermined time interval following said previous operation, said power factor relay being operable to effect deenergization of said synchronous motor upon occurrence of abnormal power factor, low voltage protective means including a time delayed stop switch mechanism for effecting deenergization of said synchronous motor upon occurrence of low voltage and for effecting automatic resynchronization of said motor if the period of occurrence of said low voltage is less than a predetermined period of time, said time delay stop switch mechanism including an actuating relay, gear mechanism, a one-way clutch and an escapement mechanism, said actuating relay upon energization effecting instantaneous setting of said stop switch due to the overrunning of said one-way clutch but upon deenergization of said one-way clutch but upon deenergization effecting a drive through said gear mechanism, one way clutch and escapement which effects a time relay in the operation of said stop switch mechanism.

10. A control system for a synchronous motor comprising, in combination, a synchronous motor including armature and field windings, an alternating current source of potential for said armature winding, a direct current source of potential for said field winding, time delay means for completing an electrical circuit from said direct current source to said field winding after said motor has operated for a predetermined period of time, a power factor relay which is operable by said alternating current source of potential, a circuit for said power factor relay which is completed by said time delay means at a predetermined time interval following said previous operation, said power factor relay being operable to effect deenergization of said synchronous motor upon occurrence of abnormal power factor, said time delay means including a second synchronous motor, a train of gears, and two pairs of contact members which are successively operated after predetermined periods of operation of said second synchronous motor, the operation of said first pair of contact members being effective to complete a circuit from said direct current source to said field winding and the second of said pair of contact members being effective to complete a circuit through said power factor relay, low voltage protective means including a time delayed stop switch mechanism for effecting deenergization of said synchronous motor upon occurrence of low voltage and for effecting automatic resynchronization of said motor if the period of occurrence of said low voltage is less than a predetermined period of time, said time delay stop switch mechanism including an actuating relay, gear mechanism, a one-way clutch and an escapement mechanism, said actuating relay upon energization effecting instantaneous setting of said stop switch due to the overrunning of said one-way clutch but upon deenergization effecting a drive through said gear mechanism, one-way clutch and escapement which effects a time delay in the operation of said stop switch mechanism.

11. A control system for a synchronous motor comprising, in combination, a synchronous motor including armature and field windings, an alternating current source of potential for said armature winding, a direct current source of potential for said field winding, a power factor meter having voltage and current coils which are energized by said alternating current source, time delay switching means including a second synchronous motor, a train of gears, and two pairs of contact members which are successively operated after predetermined periods of operation of said second synchronous motor, the operation of the first pair of said contact members being effective to complete a circuit from said direct current source to said field winding and the operation of the second pair being effective to complete a circuit through said voltage coil of said power factor meter, low voltage protective means including a time delayed stop switch mechanism for effecting deenergization of said synchronous motor upon occurrence of low voltage and for effecting automatic resynchronization of said motor if the period of occurrence of said low voltage is less than a predetermined period of time, said time delay stop switch mechanism including an actuating relay, gear mechanism, a one-way clutch and an escapement mechanism, said actuating relay upon energization effecting instantaneous setting of said stop switch due to the overrunning of said one-way clutch but upon deenergization effecting a drive through said gear mechanism, one-way clutch and escapement which effects a time delay in the operation of said stop switch mechanism.

12. A control system for a synchronous motor comprising, in combination, a synchronous motor including armature and field windings, an alternating current source of potential for said armature winding, a direct current source of potential for said field winding, a power factor meter having voltage current coils which are energized by one of the phases of said alternating current source, time delay switching means including a second synchronous motor which is coupled to a train of gears through a clutch, a pair of cam operated switches operable by said train of gears, and electromagnetic operating means which upon energization effects engagement of said clutch and successive operation of said cam operated switches, the first switch effecting completion of a circuit between said direct current source and said field winding and the second switch effecting closure of a circuit through said power factor meter and also effecting deenergization of said second synchronous motor and allowing operation of a spring means for restoring the cams of said switches to their initial positions, low voltage protective means including a time delayed stop switch mechanism for effecting deenergization of said motor if the period of occurrence of said low voltage is less than a predetermined period of time, said time delay stop switch mechanism including an actuating relay, gear mechanism, a one-way clutch and an escapement mechanism, said actuating relay upon energization effecting instantaneous setting of said stop switch due to the overrunning of said one-way clutch but upon deenergization effecting a drive through said gear mechanism, one way clutch and escapement which effects a time delay in the operation of said stop switch mechanism.

JAMES G. STEPHENSON.